US012756057B2

(12) United States Patent
Zhou et al.

(10) Patent No.: US 12,756,057 B2
(45) Date of Patent: Oct. 6, 2026

(54) END CAP, BATTERY CELL, BATTERY, AND POWER CONSUMING DEVICE

(71) Applicant: CONTEMPORARY AMPEREX TECHNOLOGY (HONG KONG) LIMITED, Hong Kong (CN)

(72) Inventors: Wenlin Zhou, Ningde (CN); Quankun Li, Ningde (CN); Wenwei Chen, Ningde (CN); Peng Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 630 days.

(21) Appl. No.: 18/335,619

(22) Filed: Jun. 15, 2023

(65) Prior Publication Data

US 2023/0344068 A1 Oct. 26, 2023

Related U.S. Application Data

(63) Continuation of application No. PCT/CN2022/070206, filed on Jan. 5, 2022.

(30) Foreign Application Priority Data

Oct. 9, 2021 (CN) ........................ 202122434797.4

(51) Int. Cl.
*H01M 10/0585* (2010.01)
*H01M 50/147* (2021.01)
(Continued)

(52) U.S. Cl.
CPC ..... *H01M 50/342* (2021.01); *H01M 10/0585* (2013.01); *H01M 50/147* (2021.01);
(Continued)

(58) Field of Classification Search
CPC ........... H01M 50/342; H01M 10/0585; H01M 50/147; H01M 50/204; H01M 2220/20;
(Continued)

(56) References Cited

U.S. PATENT DOCUMENTS

| | | | | |
|---|---|---|---|---|
| 2009/0068550 A1* | 3/2009 | Uh | H01M 50/3425 | 429/82 |
| 2010/0028759 A1* | 2/2010 | Ebine | H01M 50/188 | 429/163 |

(Continued)

FOREIGN PATENT DOCUMENTS

| | | |
|---|---|---|
| CN | 205429013 U | 8/2016 |
| CN | 205846021 U | 12/2016 |

(Continued)

OTHER PUBLICATIONS

The European Patent Office (EPO) The Extended European Search Report for Application No. 22877747.0 Sep. 6, 2024 8 Pages.

(Continued)

*Primary Examiner* — Lisa S Park
(74) *Attorney, Agent, or Firm* — ANOVA LAW GROUP, PLLC

(57) ABSTRACT

An end cap includes a first recess recessed from a side facing toward an electrode assembly of a battery cell and away from the electrode assembly, and a second recess recessed from a side facing away from the electrode assembly and toward the electrode assembly. A bottom wall of the second recess includes a first part and a second part surrounding the first part. The first part and a bottom wall of the first recess are opposite to each other in a thickness direction of the end cap. The end cap further includes a pressure relief portion formed between the first part and the bottom wall of the first recess, and configured to be actuated when an internal pressure of the battery cell reaches a threshold. A side of the
(Continued)

second part facing away from the electrode assembly forms an avoidance space to avoid the pressure relief portion.

16 Claims, 5 Drawing Sheets

(51) Int. Cl.
*H01M 50/204* (2021.01)
*H01M 50/342* (2021.01)

(52) U.S. Cl.
CPC ...... *H01M 50/204* (2021.01); *H01M 2220/20* (2013.01); *H01M 2220/30* (2013.01)

(58) Field of Classification Search
CPC ........... H01M 2220/30; H01M 50/103; H01M 50/15; H01M 50/209; Y02E 60/10
See application file for complete search history.

(56) References Cited

U.S. PATENT DOCUMENTS

| | | | | |
|---|---|---|---|---|
| 2011/0206957 | A1* | 8/2011 | Byun | H01M 50/147<br>429/56 |
| 2012/0156532 | A1 | 6/2012 | Han | |
| 2012/0214029 | A1 | 8/2012 | Lee et al. | |
| 2012/0237803 | A1* | 9/2012 | Mardall | H01M 10/653<br>429/53 |

FOREIGN PATENT DOCUMENTS

| | | | | |
|---|---|---|---|---|
| CN | 108695450 | A | | 10/2018 |
| CN | 207967196 | U | | 10/2018 |
| CN | 208014752 | U | | 10/2018 |
| CN | 209169200 | U | | 7/2019 |
| CN | 209526141 | U | | 10/2019 |
| CN | 209691830 | U | | 11/2019 |
| CN | 111029488 | A | | 4/2020 |
| CN | 211929544 | U | | 11/2020 |
| CN | 211929545 | U | | 11/2020 |
| CN | 212810414 | U | | 3/2021 |
| CN | 213026310 | U | | 4/2021 |
| CN | 214254572 | U | | 9/2021 |
| EP | 3800696 | A1 | | 4/2021 |
| JP | 2002008615 | A | | 1/2002 |
| JP | 2014-102935 | | * | 6/2014 |
| JP | 2014102935 | A | | 6/2014 |
| KR | 2006-0020211 | | * | 3/2006 |
| TW | M514659 | U | | 12/2015 |
| WO | 2011096035 | A1 | | 8/2011 |

OTHER PUBLICATIONS

The World Intellectual Property Organization (WIPO) International Search Report for PCT/CN2022/070206 May 30, 2022 4 pages (including English translation).
State Intellectual Property Office of China Notice of Grant of Invention Patent Right for Application No. 202280009308.5 Jun. 3, 2026 8 pages (including translation).

* cited by examiner

END CAP, BATTERY CELL, BATTERY, AND POWER CONSUMING DEVICE

CROSS-REFERENCE TO RELATED APPLICATIONS

The present application is a continuation of International Application No. PCT/CN2022/070206, filed on Jan. 5, 2022, which claims priority to Chinese patent application no. 202122434797.4, entitled "END CAP, BATTERY CELL, BATTERY, AND POWER CONSUMING DEVICE", filed on Oct. 9, 2021, which are incorporated herein by reference in their entirety.

TECHNICAL FIELD

The present application relates to the field of batteries, and particularly to an end cap, a battery cell, a battery and a power consuming device.

BACKGROUND ART

Battery cells are widely used in electronic devices, such as a mobile phone, a notebook computer, an electromobile, an electric vehicle, an electric airplane, an electric ship, an electric toy car, an electric toy ship, an electric toy airplane, and an electric tool. The battery cells may include a nickel-cadmium battery cell, a nickel-hydrogen battery cell, a lithium-ion battery cell, a secondary alkaline zinc-manganese battery cell, etc.

In the development of the battery technology, in addition to improving the performance of battery cells, the safety is also a non-negligible issue. If the safety of battery cells cannot be guaranteed, the battery cells cannot be used. Therefore, how to enhance the safety of battery cells is an urgent technical problem to be solved in the battery technology.

SUMMARY

The present application provides an end cap, a battery cell, a battery and a power consuming device, which can improve the safety of the battery cell.

According to a first aspect, an embodiment of the present application provides an end cap of a battery cell, the end cap including:

- a first recess recessed from the side of the end cap facing toward an electrode assembly in a direction away from the electrode assembly;
- a second recess recessed from the side of the end cap facing away from the electrode assembly of the battery cell in a direction toward the electrode assembly, wherein a bottom wall of the second recess includes a first part and a second part surrounding an outer side of the first part, and the first part and a bottom wall of the first recess are arranged opposite to each other in a thickness direction of the end cap; and
- a pressure relief portion formed between the first part and the bottom wall of the first recess, wherein the pressure relief portion is configured to be actuated, when an internal pressure of the battery cell reaches a threshold, to relieve the internal pressure, and the side of the second part facing away from the electrode assembly forms an avoidance space to avoid the pressure relief portion when the pressure relief portion is actuated.

In the above solution, when the battery cell is short-circuited or overcharged, the pressure relief portion is partially broken and folded outward to form a channel for relief of the internal pressure, so as to reduce the risk of explosion or fire of the battery cell, thereby improving the safety. In this solution, the side of the second part facing away from the electrode assembly forms the avoidance space to reduce the risk of the pressure relief portion being blocked by other parts of the end cap, thereby ensuring the internal-pressure relief efficiency and improving the safety of the battery cell.

In some embodiments, the bottom wall of the first recess and/or the first part is provided with a third recess, and the pressure relief portion is configured to be broken at the third recess to relieve the internal pressure when the internal pressure of the battery cell reaches the threshold.

In the above solution, with the provision of the third recess, the pressure relief portion may be broken and folded along a predetermined position when the internal pressure of the battery cell reaches the threshold.

In some embodiments, when the pressure relief portion is actuated, at least part of the pressure relief portion is folded into the second recess.

In some embodiments, a projection of the third recess in the thickness direction is linear, cross-shaped, U-shaped or ring-shaped.

In some embodiments, the third recess is ring-shaped and includes a first sub-recess and a second sub-recess that are continuously provided along its own circumference, and the first sub-recess has a depth greater than that of the second sub-recess so that when the internal pressure of the battery cell reaches the threshold, the pressure relief portion is broken at the first sub-recess and folded along the bottom of the second sub-recess.

In the above solution, with the provision of the first sub-recess and the second sub-recess having different depths, the pressure relief portion is broken at a predetermined position and a folding direction of the pressure relief portion is limited. In this solution, the second sub-recess is provided at the folding position, so that the difficulty in folding the pressure relief portion can be reduced and the internal-pressure relief efficiency can be improved.

In some embodiments, the end cap includes: a body portion including an inner surface and an outer surface arranged opposite to each other in the thickness direction, the inner surface facing toward the electrode assembly; a first protrusion protruding from the inner surface, wherein the first recess is recessed from a top end face of the first protrusion in the direction away from the electrode assembly; and a second protrusion protruding from the outer surface, wherein the second recess is recessed from a top end face of the second protrusion in the direction toward the electrode assembly.

In the above solution, the first protrusion and the second protrusion are provided to increase the strength of the end cap around the pressure relief portion, reduce deformation of the pressure relief portion during back and forth flipping of the end cap, reduce an acting force transmitted to the pressure relief portion, slow down fatigue aging of the pressure relief portion, and reduce the risk of premature breakage of the end cap under the normal use of the battery cell, facilitating improvement of the safety and stability of the battery cell.

In some embodiments, the second recess has a depth in the thickness direction that is greater than a size of the second protrusion in the thickness direction, so that the bottom wall of the second recess is closer to the electrode assembly than the outer surface.

In the above solution, the depth of the second recess can be ensured to increase an interval between the bottom wall of the second recess and the top end face of the second protrusion in the thickness direction, thereby reducing the risk of the pressure relief portion being damaged by an external member and improving the safety.

In some embodiments, the first recess has a depth in the thickness direction that is less than a size of the first protrusion in the thickness direction, so that the bottom wall of the first recess is closer to the electrode assembly than the inner surface.

When the battery cell is used upside down, the end cap is located on the lower side of the electrode assembly. In the above solution, since the bottom wall of the first recess is closer to the electrode assembly than the inner surface, later in the cycle of the battery cell, an electrolyte solution is more likely to accumulate on the inner surface than on the bottom wall of the first recess. That is, this solution can reduce the amount of liquid stored in the first recess and reduce the risk of aging of the pressure relief portion caused by corrosion.

In some embodiments, in the thickness direction, the first protrusion has a size greater than that of the second protrusion.

In the above solution, while ensuring the strength of the part of the end cap near the pressure relief portion, the second protrusion has a relatively small size, so that the maximum size of the battery cell can be reduced, increasing the energy density.

In some embodiments, the end cap further includes: a connecting portion surrounding an outer side of the body portion and extending in the direction toward the electrode assembly to form a fourth recess on the side of the body portion facing toward the electrode assembly; and a plate portion surrounding an outer side of the connecting portion, the fourth recess being recessed relative to the surface of the plate portion facing toward the electrode assembly, wherein the first protrusion is accommodated in the fourth recess.

In the above solution, with the provision of the fourth recess, an inner space of the battery cell may be increased, thereby increasing the capacity of the battery cell. Moreover, the fourth recess can also provide a space for the first protrusion so that the first protrusion protrudes enough so that the first protrusion is prevent from abutting against the electrode assembly.

In some embodiments, the end cap is of an integrally formed structure.

In the above solution, the pressure relief portion having a pressure relief function is integrated onto the end cap, so that the structure of the battery cell is simplified.

According to a second aspect, an embodiment of the present application provides a battery cell, including: a housing provided with an opening; an electrode assembly accommodated in the housing; and the end cap according to any embodiment in the first aspect, configured to cover the opening of the housing.

According to a third aspect, an embodiment of the present application provides a battery, including a case and the battery cell in the second aspect, the battery cell being received in the case.

According to a fourth aspect, an embodiment of the present application provides a power consuming device, including the battery in the third aspect, the battery being configured to supply electric energy.

BRIEF DESCRIPTION OF THE DRAWINGS

Features, advantages, and technical effects of exemplary embodiments of the present application will be described below with reference to accompanying drawings.

Figure 1:
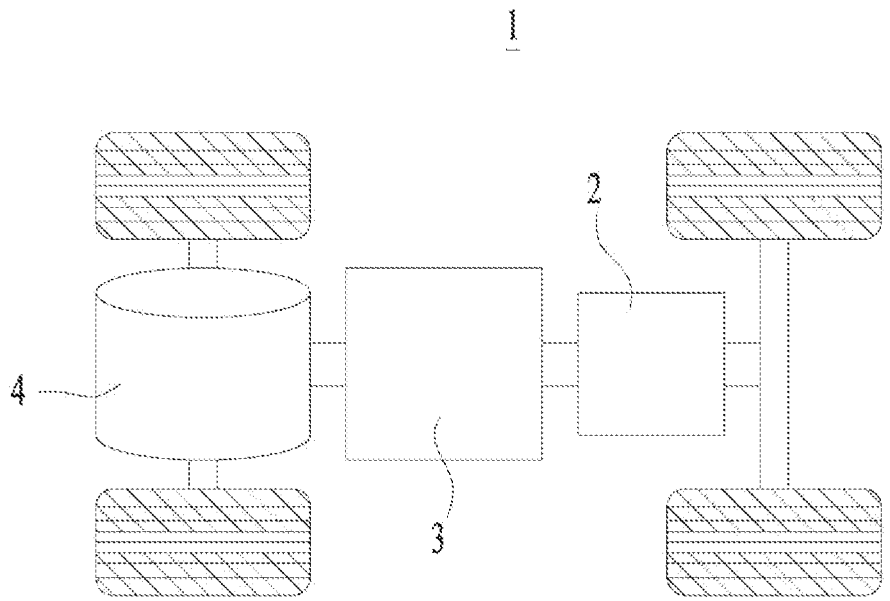
FIG. 1 is a schematic structural diagram of a vehicle provided in some embodiments of the present application.

In the drawings, the figures are not necessarily drawn to scale.

DETAILED DESCRIPTION OF EMBODIMENTS

In order to make the objectives, technical solutions and advantages of the embodiments of the present application clearer, the technical solutions in the embodiments of the present application will be described clearly below with reference to the drawings in the embodiments of the present application. Obviously, the embodiments described are some of, rather than all of, the embodiments of the present application. All the other embodiments obtained by those of ordinary skill in the art based on the embodiments of the present application without any creative effort shall fall within the scope of protection of the present application.

Unless otherwise defined, all technical and scientific terms used in the present application have the same meanings as those commonly understood by those skilled in the art to which the present application belongs. The terms used in the description of the present application are merely for the purpose of describing specific embodiments, but are not intended to limit the present application. The terms "comprising" and "having" and any variations thereof in the description and the claims of the present application as well as the brief description of the accompanying drawings described above are intended to cover non-exclusive inclusion. The terms "first", "second", etc. in the description and the claims of the present application as well as the foregoing accompanying drawings are used to distinguish between different objects, rather than describing a specific order or a primary-secondary relationship.

In the present application, "embodiment" mentioned means that the specific features, structures and characteristics described in conjunction with the embodiments may be included in at least one embodiment of the present application. The phrase at various locations in the description does not necessarily refer to the same embodiment, or an independent or alternative embodiment exclusive of another embodiment.

In the description of the present application, it should be noted that, the terms "mount", "connected", "connect", or "attach" should be interpreted in a broad sense unless explicitly defined and limited otherwise. For example, they may be a fixed connection, a detachable connection, or an integral connection; or may be a direct connection, an indirect connection by means of an intermediate medium, or internal communication between two elements. For those of ordinary skill in the art, the specific meaning of the foregoing term in the present application may be understood according to specific circumstances.

The term “and/or” in the present application is merely a description of the associated relationship of associated objects, representing that three relationships may exist. For example, A and/or B, may be expressed as: the three instances of A alone, A and B simultaneously, and B alone. In addition, the character “/” in the present application generally indicates that the associated objects before and after the character are in a relationship of “or”.

In the embodiments of the present application, the same reference numerals denote the same components, and for the sake of brevity, the detailed description of the same components is omitted in different embodiments. It should be understood that the dimensions, such as thickness, length and width, of the various components in the embodiments of the present application illustrated in the accompanying drawings, as well as the dimensions, such as an overall thickness, length and width, of an integrated apparatus are merely illustrative and should not be construed to limit the present application in any way.

“A plurality of” appearing in the present application means two or more (including two).

In the present application, a battery cell may include a lithium-ion secondary battery cell, a lithium-ion primary battery cell, a lithium-sulfur battery cell, a sodium-lithium-ion battery cell, a sodium-ion battery cell, a magnesium-ion battery cell, or the like, which is not limited in the embodiments of the present application. The battery cell may be cylindrical, flat, cuboid or in another shape, which will also not be limited in the embodiments of the present application.

A battery mentioned in the embodiments of the present application refers to a single physical module including one or more battery cells to provide a high voltage and capacity. For example, the battery mentioned in the present application may include a battery module, a battery pack, etc. The battery generally includes a case for enclosing one or more battery cells. The case can prevent liquid or other foreign matters from affecting the charging or discharging of a battery cell.

The battery cell includes an electrode assembly and an electrolyte solution. The electrode assembly includes a positive electrode plate, a negative electrode plate, and a separator. The battery cell operates mainly by relying on movements of metal ions between the positive electrode plate and the negative electrode plate. The positive electrode plate includes a positive current collector and a positive active material layer. A surface of the positive current collector is coated with the positive active material layer; and the positive current collector includes a positive coated region and a positive tab connected to the positive coated region, the positive coated region is coated with the positive active material layer, and the positive tab is not coated with the positive active material layer. Taking a lithium-ion battery as an example, the positive current collector may be made of aluminum, and the positive active material layer comprises a positive active material which may be lithium cobalt oxides, lithium iron phosphate, ternary lithium, lithium manganate, etc. The negative electrode plate includes a negative current collector and a negative active material layer. A surface of the negative current collector is coated with the negative active material layer; and the negative current collector includes a negative coated region and a negative tab connected to the negative coated region, the negative coated region is coated with the negative active material layer, and the negative tab is not coated with the negative active material layer. The negative current collector may be made of copper, and the negative active material layer comprises a negative active material which may be carbon, silicon, etc. The separator may be made of polypropylene (PP), polyethylene (PE), etc.

The battery cell further includes a housing and an end cap. The housing is provided with an opening and used to accommodate the electrode assembly. The electrode assembly may be assembled into the housing through the opening of the housing. The end cap is configured to cover the opening of the housing.

Design factors on many aspects need to be simultaneously considered for the development of the battery technology, such as energy density, cycling life, discharge capacity, charge-discharge rate, and other performance parameters. In addition, the safety of the battery needs to be taken into account.

A pressure relief mechanism on the battery cell has an important effect on the safety of the battery cell. For example, when a phenomenon such as a short circuit or overcharge occurs, the battery cell may be internally subjected to thermal runaway and the pressure may suddenly rise. In this case, the internal pressure can be relieved to outside by actuating the pressure relief mechanism to prevent the battery cell from exploding and catching fire.

The pressure relief mechanism refers to an element or component that is actuated, when an internal pressure of the battery cell reaches a predetermined threshold, to relieve the internal pressure. The threshold design varies according to different design requirements. The threshold may depend on materials of one or more of the positive electrode plate, the negative electrode plate, the electrolyte solution, and the separator in the battery cell.

The pressure relief mechanism may be in the form of an explosion-proof valve, a gas valve, a pressure relief valve, a safety valve, etc., and may specifically use a pressure-sensitive element or construction. That is, when the internal pressure of the battery cell reaches a predetermined threshold, the pressure relief mechanism performs an action or a weakened structure provided in the pressure relief mechanism is broken, thereby creating an opening or a channel for relief of the internal pressure.

The “actuated” mentioned in the present application means that the pressure relief mechanism acts or is activated into a certain state, such that the internal pressure of the battery cell is relieved. Actions produced by the pressure relief mechanism may include, but are not limited to, at least a portion of the pressure relief mechanism being broken, cracking, being torn or opened, etc. When the pressure relief mechanism is actuated, high-temperature and high-pressure substances inside the battery cell are discharged outwards from an actuated part as emissions. In this way, the pressure of the battery cell can be relieved at a controllable pressure, thereby preventing the occurrence of potentially more serious accidents.

The emissions from the battery cell mentioned in the present application include, but are not limited to, the electrolyte solution, dissolved or split positive and negative electrode plates, fragments of the separator, a high-temperature and high-pressure gas generated by a reaction, flames, etc.

In order to simplify the structure of the battery cell, the inventors tried to integrate the pressure relief mechanism onto the end cap. For example, the inventors created a recess on the end cap to form a pressure relief portion configured to be actuated, when an internal pressure of the battery cell reaches a threshold, to relieve the internal pressure. When a phenomenon such as a short circuit or overcharge occurs, the battery cell may be internally subjected to thermal runaway and the pressure may thus suddenly rise. In this case, the pressure relief portion is partially broken and folded outward to form a channel for relief of the internal pressure, so as to reduce the risk of explosion or fire of the battery cell, thereby improving the safety.

However, the inventors discovered the problem of low rate of internal-pressure relief during thermal runaway and then analyzed and studied the structure of the battery cell. The inventors found that the position of the pressure relief portion corresponds to the position of the recess, and when the pressure relief portion is folded outward under the action of the internal pressure, the pressure relief portion is likely to be blocked by a side wall of the recess, so that the outward-folding degree of the pressure relief portion is limited, resulting in a low pressure relief rate.

In view of this, embodiments of the present application provide a technical solution, in which an end cap of a battery cell includes: a first recess recessed from the side of the end cap facing toward an electrode assembly in a direction away from the electrode assembly; a second recess recessed from the side of the end cap facing away from the electrode assembly of the battery cell in a direction toward the electrode assembly, wherein a bottom wall of the second recess includes a first part and a second part surrounding an outer side of the first part, and the first part and a bottom wall of the first recess are arranged opposite to each other in a thickness direction of the end cap; and a pressure relief portion formed between the first part and the bottom wall of the first recess, wherein the pressure relief portion is configured to be actuated, when an internal pressure of the battery cell reaches a threshold, to relieve the internal pressure, and the side of the second part facing away from the electrode assembly forms an avoidance space to avoid the pressure relief portion when the pressure relief portion is actuated. The end cap having such a structure can reduce the risk of the pressure relief portion being blocked, thereby ensuring the internal-pressure relief efficiency and improving the safety of the battery cell.

The technical solutions described in the embodiments of the present application are applicable to a battery and a power consuming device using a battery.

The power consuming device may be a vehicle, a mobile phone, a portable device, a notebook computer, a ship, a spacecraft, an electric toy, an electric tool, etc. The vehicle may be a fuel vehicle, a gas vehicle or a new-energy vehicle. The new-energy vehicle may be a battery electric vehicle, a hybrid vehicle, an extended-range vehicle, etc. The spacecraft includes an airplane, a rocket, an aerospace plane, a spaceship, etc. The electric toy includes a stationary or mobile electric toy, such as a game machine, an electric toy car, an electric toy ship, and an electric toy airplane. The electric tool includes a metal cutting electric tool, a grinding electric tool, an assembling electric tool, and a railway electric tool, such as an electric drill, an electric grinder, an electric wrench, an electric screwdriver, an electric hammer, an electric impact drill, a concrete vibrator, and an electric planer. The power consuming devices are not specifically limited in the embodiments of the present application.

For ease of description, an example in which a power consuming device refers to a vehicle is used for description in the following embodiments.

FIG. 1 is a schematic structural diagram of a vehicle provided in some embodiments of the present application. As shown in FIG. 1, a battery 2 is provided inside the vehicle 1, and the battery 2 may be arranged at the bottom, the head or the tail of the vehicle 1. The battery 2 may be configured to supply power to the vehicle 1. For example, the battery 2 may be used as an operational power supply for the vehicle 1.

The vehicle 1 may further include a controller 3 and a motor 4, and the controller 3 is configured to control the battery 2 to supply power to the motor 4, for example, to satisfy a working electricity need during start, navigation, and driving of the vehicle 1.

In some embodiments of the present application, the battery 2 can not only serve as a power supply for operating the vehicle 1, but also serve as a power supply for driving the vehicle 1, in place of or partially in place of fuel or natural gas, to provide driving power for the vehicle 1.

Figure 2:
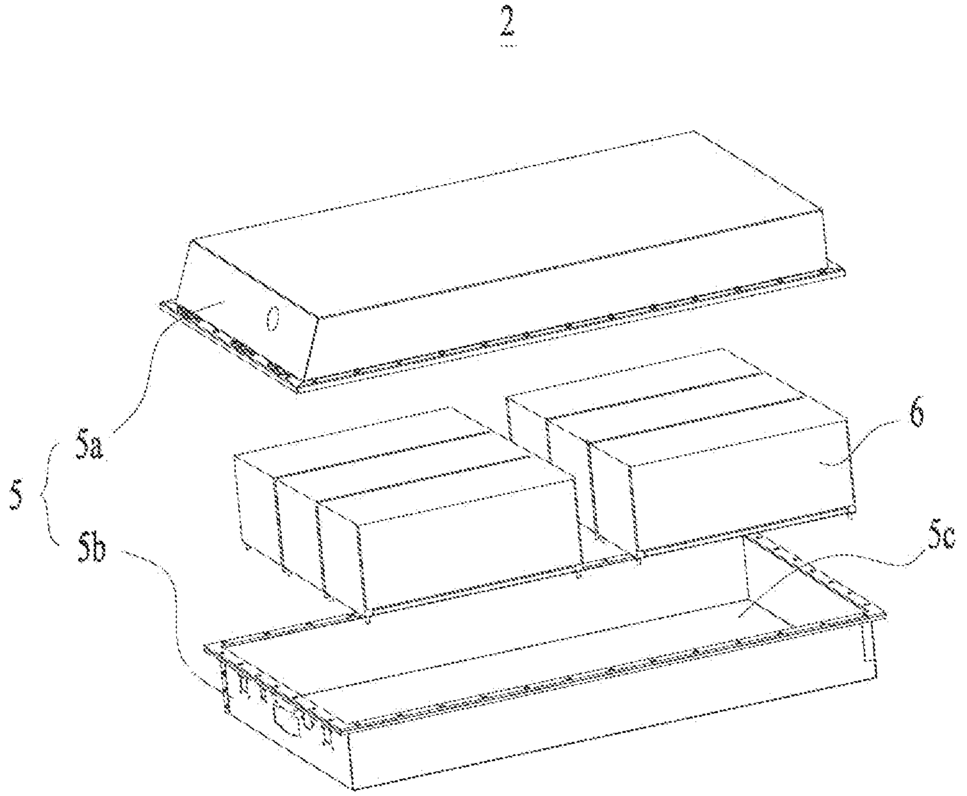
FIG. 2 is a schematic exploded view of a battery provided in some embodiments of the present application.

FIG. 2 is a schematic exploded view of a battery provided in some embodiments of the present application. As shown in FIG. 2, the battery 2 includes a case 5 and battery cells (not shown in FIG. 2) which are accommodated in the case 5.

The case 5 is configured to accommodate the battery cells, and the case 5 may have various structures. In some embodiments, the case 5 may include a first case part **5*a* and a second case part 5*b*, the first case part 5*a* and the second case part 5*b* cover each other, and the first case part 5*a* and the second case part 5*b* jointly define an accommodating space 5*c* for accommodating the battery cells. The second case part 5*b* may be of a hollow structure with one end opened, the first case part 5*a* is of a plate-like structure, and the first case part 5*a* covers the open side of the second case part 5*b* to form the case 5 having the accommodating space 5*c*. The first case part 5*a* and the second case part 5*b* each may also be of a hollow structure with one side opened, and the open side of the first case part 5*a* covers the open side of the second case part 5*b* to form the case 5 having the accommodating space 5*c*. Of course, the first case part 5*a* and the second case part 5*b*** may have various shapes such as a cylinder and a cuboid.

To improve the sealing performance after the first case part **5*a* and the second case part 5*b* are connected to each other, a seal, such as a sealant and a seal ring, may be also provided between the first case part 5*a* and the second case part 5*b***.

Assuming that the first case part **5*a* covers the top of the second case part 5*b*, the first case part 5*a* may also be referred to as an upper case cover, and the second case part 5*b*** may also be referred to as a lower case body.

In the battery 2, one or more battery cells may be provided. If a plurality of battery cells are provided, the plurality of battery cells may be in series connection or parallel connection or series-parallel connection. The series-parallel connection means that some of the plurality of battery cells are in series connection and some are in parallel connection. The plurality of battery cells may be directly in series connection or parallel connection or series-parallel connection, and then a unit composed of the plurality of battery cells is accommodated in the case 5. Of course, a plurality of battery cells may also be first in series connection or parallel connection or series-parallel connection to form a battery module 6, and a plurality of battery modules 6 are in series connection or parallel connection or series-parallel connection to form a unit and are accommodated in the case 5.

Figure 3:
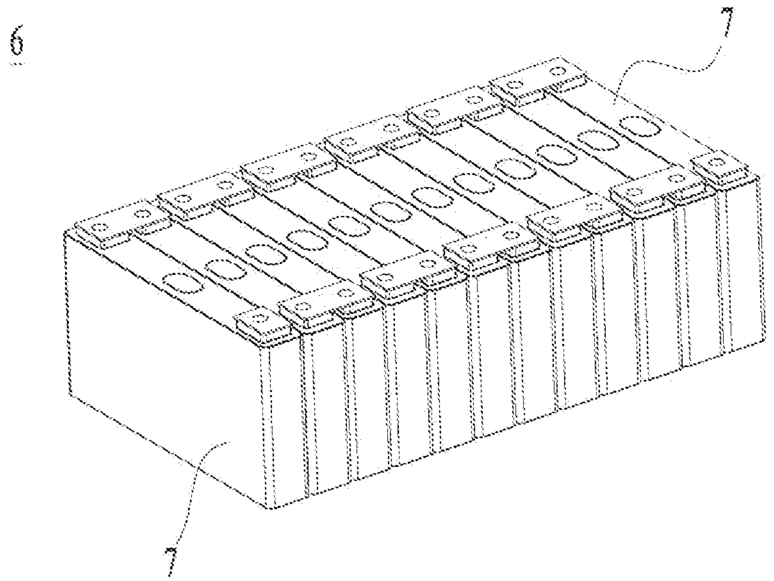
FIG. 3 is a schematic exploded view of a battery module shown in FIG. 2.

FIG. 3 is a schematic exploded view of a battery module shown in FIG. 2.

In some embodiments, as shown in FIG. 3, a plurality of battery cells 7 are provided. The plurality of battery cells 7 are connected in series or in parallel or in series-parallel to form a battery module 6. A plurality of battery modules 6 are in turn connected in series or in parallel or in series-parallel to form a unit and are accommodated in the case.

The plurality of battery cells 7 in the battery module 6 may be electrically connected to each other by means of a busbar component to implement series connection or parallel connection or series-parallel connection between the plurality of battery cells 7 in the battery module 6.

Figure 4:
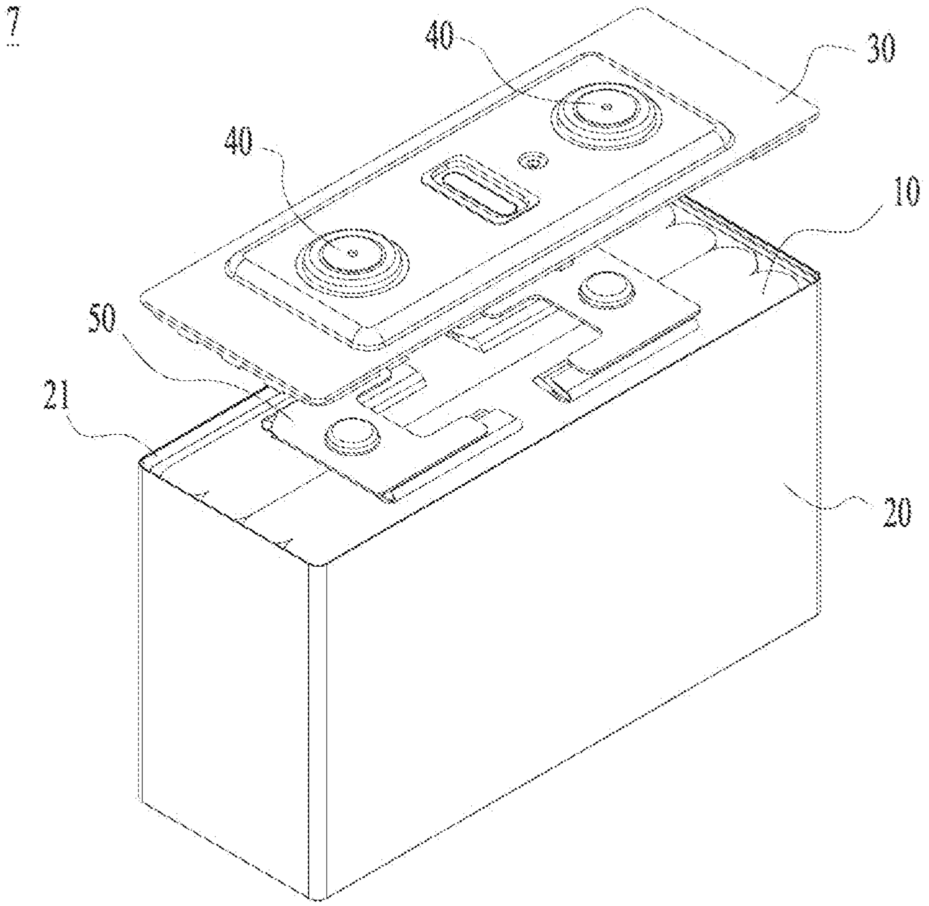
FIG. 4 is a schematic exploded view of a battery cell provided in some embodiments of the present application.

FIG. 4 is a schematic exploded view of a battery cell provided in some embodiments of the present application.

As shown in FIG. 4, a battery cell 7 according to the embodiments of the present application includes: a housing 20 provided with an opening 21; an electrode assembly 10 accommodated in the housing 20; and an end cap 30 configured to cover the opening 21 of the housing 20.

The electrode assembly 10 includes a first electrode plate, a second electrode plate, and a separator configured to separate the first electrode plate from the second electrode plate. The first electrode plate and the second electrode plate have opposite polarities. In other words, one of the first electrode plate and the second electrode plate is a positive electrode plate, and the other of the first electrode plate and the second electrode plate is a negative electrode plate.

Optionally, the first electrode plate, the second electrode plate and the separator each is of a strip-shaped structure, and the first electrode plate, the second electrode plate and the separator are wound as one piece to form a wound structure. The wound structure may be a cylindrical structure, a flat structure or a structure of another shape. Alternatively, the first electrode plate and the second electrode plate each is of a plate-like structure, a plurality of first electrode plates and a plurality of second electrode plates are provided, and the plurality of first electrode plates and the plurality of second electrode plates are alternately stacked.

In the battery cell 7, one or more electrode assemblies 10 may be provided according to actual use requirements. In some examples, four separate electrode assemblies 10 are provided in the battery cell 7.

The housing 20 may be of a hollow structure with an opening on one side, or a hollow structure with openings on two sides. The end cap 30 covers the opening 21 of the housing 20 and forms a hermetic connection, thereby forming an accommodating cavity for accommodating the electrode assembly 10 and the electrolyte solution.

The housing 20 may have various shapes such as a cylinder and a cuboid. The housing 20 may be shaped depending on the specific shape of the electrode assembly 10. For example, if the electrode assembly 10 is of a cylindrical structure, a cylindrical housing may be used; and if the electrode assembly 10 is of a cuboid structure, a cuboid housing may be used.

In some embodiments, the battery cell 7 further includes two electrode terminals 40. The two electrode terminals 40 may be arranged on the end cap 30. The two electrode terminals 40 are a positive electrode terminal and a negative electrode terminal respectively. Each electrode terminal 40 is correspondingly provided with a connecting member 50, which may be referred to as a current collecting member and is located between the end cap 30 and the electrode assembly 10 to achieve the electrical connection between the electrode assembly 10 and the electrode terminal 40.

Figure 5:
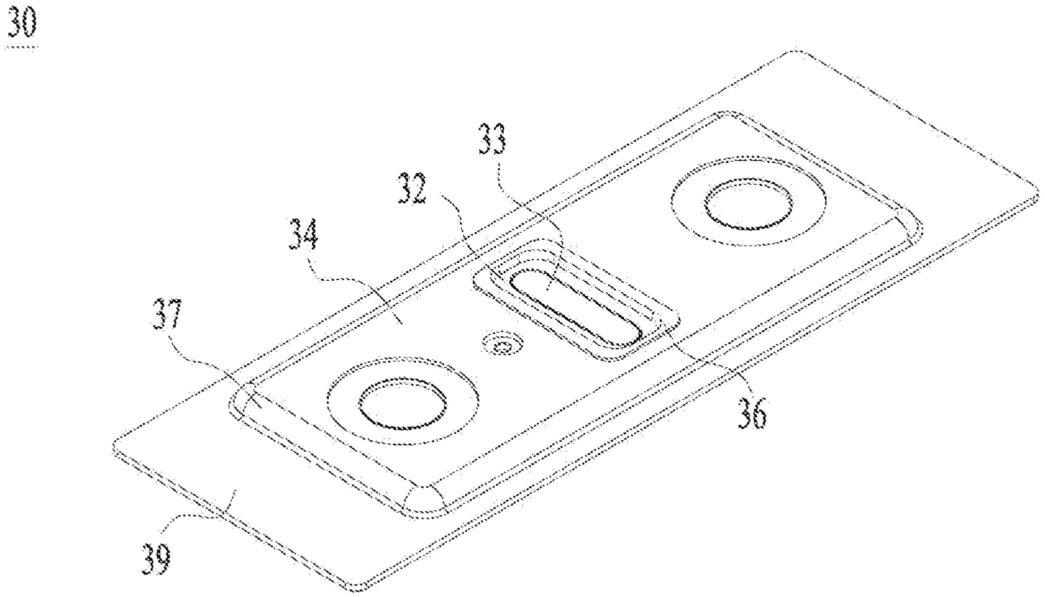
FIG. 5 is a schematic structural diagram of an end cap of a battery cell provided in some embodiments of the present application.
Figure 6:
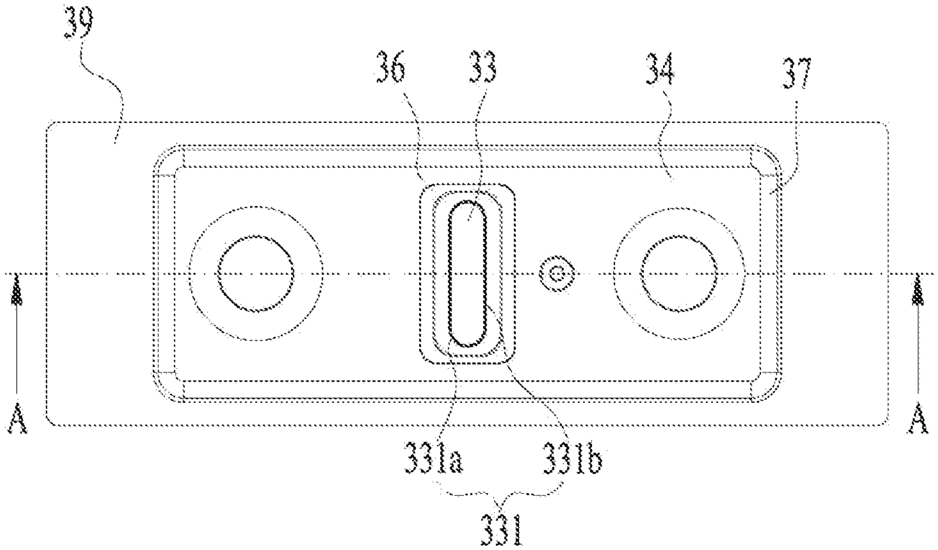
FIG. 6 is a schematic top view of the end cap shown in FIG. 5.
Figure 7:
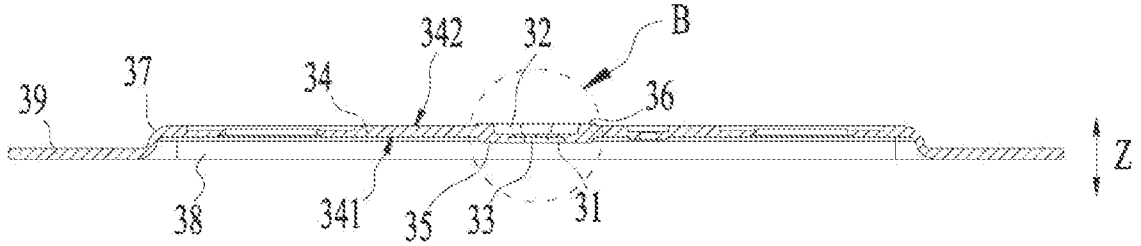
FIG. 7 is a schematic cross-sectional view of the end cap shown in FIG. 6 taken along line A-A.
Figure 8:
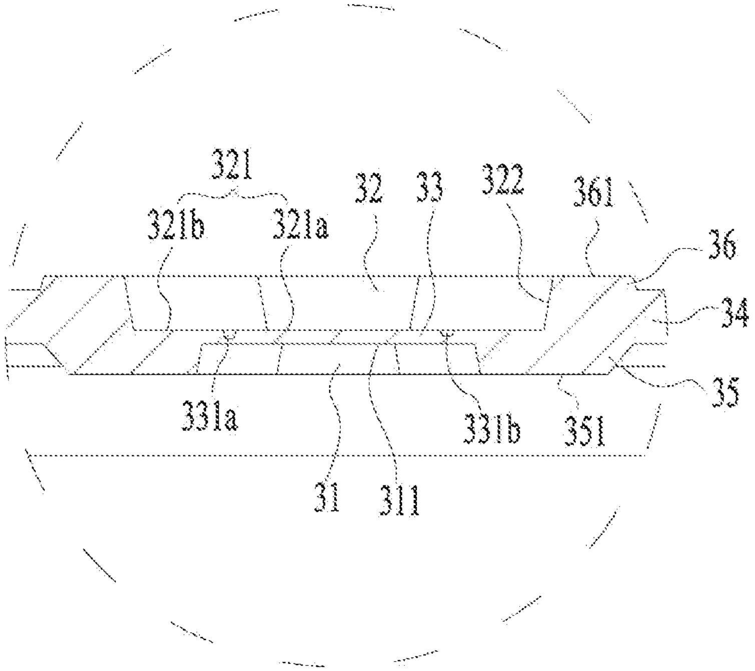
FIG. 8 is an enlarged schematic view of the end cap shown in FIG. 7 at circle B.

FIG. 5 is a schematic structural diagram of an end cap of a battery cell provided in some embodiments of the present application; FIG. 6 is a schematic top view of the end cap shown in FIG. 5; FIG. 7 is a schematic sectional view of the end cap shown in FIG. 6 taken along line A-A; and FIG. 8 is an enlarged schematic view of the end cap shown in FIG. 7 at circle B.

As shown in FIGS. 5 to 8, the end cap 30 according to the embodiments of the present application includes: a first recess 31 recessed from the side of the end cap 30 facing toward an electrode assembly in a direction away from the electrode assembly; a second recess 32 recessed from the side of the end cap 30 facing away from the electrode assembly of the battery cell in a direction toward the electrode assembly, wherein a bottom wall 321 of the second recess includes a first part **321*a* and a second part 321*b* surrounding an outer side of the first part 321*a*, and the first part 321*a* and a bottom wall 311 of the first recess are arranged opposite to each other in a thickness direction Z of the end cap 30; and a pressure relief portion 33 formed between the first part 321*a* and the bottom wall 311 of the first recess, wherein the pressure relief portion 33 is configured to be actuated, when an internal pressure of the battery cell reaches a threshold, to relieve the internal pressure, and the side of the second part 321*b* facing away from the electrode assembly forms an avoidance space to avoid the pressure relief portion 33 when the pressure relief portion 33** is actuated.

The first recess 31 is located on the side of the pressure relief portion 33 facing toward the electrode assembly, and the second recess 32 is located on the side of the pressure relief portion 33 facing away from the electrode assembly.

A projection of the first part **321*a* in the thickness direction Z fully overlaps with a projection of the bottom wall 311 of the first recess in the thickness direction Z, and a projection of the second part 321*b* in the thickness direction Z does not overlap with the projection of the bottom wall 311** of the first recess in the thickness direction Z.

The second part **321*b* is a ring-shaped surface that surrounds the outer side of the first part 321*a*. Correspondingly, the second part 321*b* surrounds the outer side of the pressure relief portion 33**.

Optionally, the bottom wall 311 of the first recess and the bottom wall 321 of the second recess are both planes parallel to each other.

Optionally, the second recess 32 further includes a side wall 322. The side wall 322 is connected to the bottom wall 321 of the second recess.

When the pressure relief portion 33 is actuated, at least part of the pressure relief portion 33 is broken, and the pressure relief portion 33 is folded outward along the broken position under the action of the internal pressure to form a channel for relieving the internal pressure.

The inventors created the recess to reduce the thickness of the pressure relief portion so as to further reduce the strength of the pressure relief portion, so that the pressure relief portion can be actuated, when the internal pressure of the battery cell reaches a threshold, to relieve the internal pressure. When the thickness of the pressure relief portion is specified, if only one side of the pressure relief portion is provided with the recess, the depth of the recess is relatively large, leading to a high difficulty in forming the recess.

In this embodiment, the first recess 31 and the second recess 32 are provided to form the pressure relief portion 33, so that depth requirements of the first recess 31 and the second recess 32 can be reduced, thereby reducing the forming difficulty. In addition, in this embodiment, the depth of the second recess 32 is reduced, so that the risk of the pressure relief portion 33 being blocked by the side wall 322 of the second recess 32 can be reduced when the pressure relief portion 33 is folded outward.

The second recess 32 is located on the side of the pressure relief portion 33 facing away from the electrode assembly. That is, the second recess 32 is located on the outer side of the pressure relief portion 33. In this embodiment, with the provision of the second recess 32, an interval between the pressure relief portion 33 and another member outside the battery cell can be increased, reducing the risk of damaging the pressure relief portion 33 by the other member.

In this embodiment, when the battery cell is short-circuited or overcharged, the pressure relief portion 33 is partially broken and folded outward to form a channel for relief of the internal pressure to reduce the risk of explosion or fire of the battery cell, thereby improving the safety. In this embodiment, the side of the second part 321*b* facing away from the electrode assembly forms the avoidance space to reduce the risk of the pressure relief portion 33 being blocked by other parts of the end cap 30, thereby ensuring the internal-pressure relief efficiency and improving the safety of the battery cell.

In some embodiments, the bottom wall 311 of the first recess and/or the first part 321*a* is provided with a third recess 331, and the pressure relief portion 33 is configured to be broken at the third recess 331 to relieve the internal pressure when the internal pressure of the battery cell reaches the threshold.

In this embodiment, the third recess 331 may be provided only in the bottom wall 311 of the first recess, or only in the first part 321*a*, or in both the bottom wall 311 of the first recess and the first part 321*a*.

When the third recess 331 is provided in the bottom wall 311 of the first recess, the third recess 331 is recessed from the bottom wall 311 of the first recess in the direction away from the electrode assembly; and when the third recess 331 is provided in the first part 321*a*, the third recess 331 is recessed from the first part 321*a* in the direction toward the electrode assembly.

In this embodiment, a weakened structure of the pressure relief portion 33 is formed by providing the third recess 331. The strength of the weakened structure is less than those of other parts of the pressure relief portion 33.

Illustratively, the third recess 331 may be formed by removing material from the pressure relief portion 33 by means of machining, which facilitates lowering of the processing cost and difficulty. The weakened structure and the third recess 331 are arranged corresponding to each other in the thickness direction Z of the end cap 30. Alternatively, the third recess 331 may also be formed by extruding the pressure relief portion 33.

In this embodiment, with the provision of the third recess 331, the pressure relief portion 33 may be broken and folded along a predetermined position when the internal pressure of the battery cell reaches the threshold.

In some embodiments, when the pressure relief portion 33 is actuated, at least part of the pressure relief portion 33 is folded into the second recess 32. When the pressure relief portion 33 is actuated, the pressure relief portion 33 is folded outward under pushing of the internal pressure.

In some embodiments, when the pressure relief portion 33 is actuated, at least part of the pressure relief portion 33 is folded into the avoidance space. In other words, when the pressure relief portion 33 is actuated, the pressure relief portion 33 and the second part 321*b* overlap at least partially in the thickness direction Z.

In this embodiment, the avoidance space may be used to accommodate at least part of the pressure relief portion 33, so that the folding degree of the pressure relief portion 33 can be increased, so as to reduce the resistance of the pressure relief portion 33 to the internal pressure, thereby improving the internal-pressure relief efficiency.

In some embodiments, the third recess 331 is ring-shaped and includes a first sub-recess 331*a* and a second sub-recess 331*b* that are continuously provided along its own circumference, and the first sub-recess 331*a* has a depth greater than that of the second sub-recess 331*b* so that when the internal pressure of the battery cell reaches the threshold, the pressure relief portion 33 is broken at the first sub-recess 331*a* and folded along the bottom of the second sub-recess 331*b*.

The strength of the first sub-recess 331*a* is less than that of the second sub-recess 331*b*.

In this embodiment, with the provision of the first sub-recess 331*a* and the second sub-recess 331*b* having different depths, the pressure relief portion 33 is broken at a predetermined position and a folding direction of the pressure relief portion 33 is limited. In this embodiment, the second sub-recess 331*b* is provided at the folding position, so that the difficulty in folding the pressure relief portion 33 can be reduced and the internal-pressure relief efficiency can be improved.

In some embodiments, a projection of the second sub-recess 331*b* in the thickness direction Z is linear. In other words, the part of the pressure relief portion 33 opposite to the second sub-recess 331*b* is linear.

In some embodiments, a projection of the third recess 331 in the thickness direction Z is linear, cross-shaped, U-shaped or ring-shaped.

In some embodiments, the end cap 30 includes: a body portion 34 including an inner surface 341 and an outer surface 342 arranged opposite to each other in the thickness direction Z, the inner surface 341 facing toward the electrode assembly; a first protrusion 35 protruding from the inner surface 341, wherein the first recess 31 is recessed from a top end face 351 of the first protrusion in the direction away from the electrode assembly; and a second protrusion 36 protruding from the outer surface 342, wherein the second recess 32 is recessed from a top end face 361 of the second protrusion in the direction toward the electrode assembly.

During transportation, temperature change or charging/discharging of the battery cell, the internal pressure of the battery cell varies alternately between high and low levels, resulting in back and forth flipping of the end cap. When the end cap flips back and forth for a long time, the pressure relief portion may be subjected to fatigue aging, leading to the risk that the pressure relief portion may be actuated before the internal pressure of the battery cell reaches the threshold.

In this embodiment, the first protrusion 35 and the second protrusion 36 are provided to increase the strength of the end cap 30 around the pressure relief portion 33, reduce deformation of the pressure relief portion 33 during back and forth flipping of the end cap 30, reduce an acting force transmitted to the pressure relief portion 33, slow down fatigue aging of the pressure relief portion 33, and reduce the risk of premature breakage of the end cap 30 under the normal use of the battery cell, facilitating improvement of the safety and stability of the battery cell.

In some embodiments, the second recess 32 has a depth in the thickness direction Z that is greater than a size of the second protrusion 36 in the thickness direction Z, so that the bottom wall of the second recess 321 is closer to the electrode assembly than the outer surface 342.

In this embodiment, the depth of the second recess 32 can be ensured to increase an interval between the bottom wall 321 of the second recess and the top end face 361 of the second protrusion in the thickness direction Z, thereby reducing the risk of the pressure relief portion 33 being damaged by an external member and improving the safety.

In some embodiments, the first recess 31 has a depth in the thickness direction Z that is less than a size of the first protrusion 35 in the thickness direction Z, so that the bottom wall 311 of the first recess is closer to the electrode assembly than the inner surface 341.

When the battery cell is used upside down, the end cap 30 is located on the lower side of the electrode assembly. In this embodiments, since the bottom wall 311 of the first recess is closer to the electrode assembly than the inner surface 341, later in the cycle of the battery cell, the electrolyte solution is more likely to accumulate on the inner surface 341 than on the bottom wall 311 of the first recess. That is, this embodiment can reduce the amount of liquid stored in the first recess 31 and reduce the risk of aging of the pressure relief portion 33 caused by corrosion.

In some embodiments, in the thickness direction Z, the first protrusion 35 has a size greater than that of the second protrusion 36.

In this embodiment, while ensuring the strength of the part of the end cap 30 near the pressure relief portion 33, the second protrusion 36 has a relatively small size, so that the maximum size of the battery cell can be reduced, increasing the energy density.

In some embodiments, the end cap 30 further includes: a connecting portion 37 surrounding an outer side of the body portion 34 and extending in the direction toward the electrode assembly to form a fourth recess 38 on the side of the body portion 34 facing toward the electrode assembly; and a plate portion 39 surrounding an outer side of the connecting portion 37, the fourth recess 38 being recessed relative to the surface of the plate portion 39 facing toward the electrode assembly, wherein the first protrusion 35 is accommodated in the fourth recess 38.

The plate portion 39 is configured to be connected to the housing.

In this embodiment, with the provision of the fourth recess 38, an inner space of the battery cell may be increased, thereby increasing the capacity of the battery cell. Moreover, the fourth recess 38 can also provide a space for the first protrusion 35 so that the first protrusion 35 protrudes enough so that the first protrusion 35 is prevent from abutting against the electrode assembly.

In some embodiments, the end cap 30 is of an integrally formed structure. In this embodiment, the pressure relief portion 33 having a pressure relief function is integrated onto the end cap 30, so that the structure of the battery cell is simplified.

Figure 9:
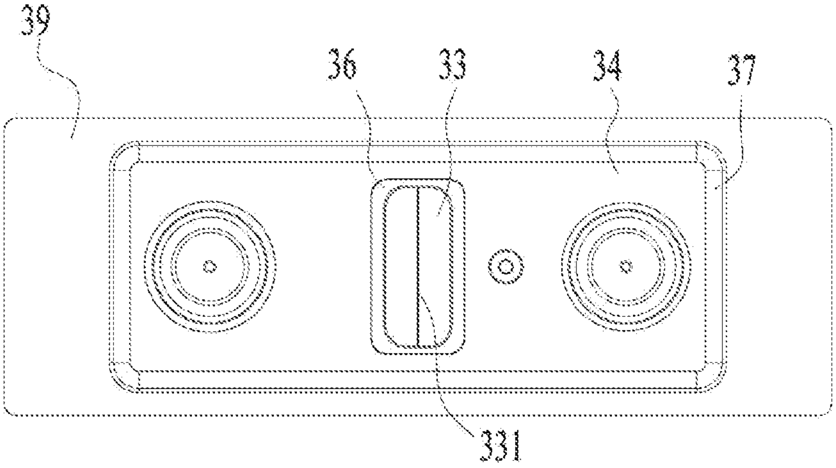
FIG. 9 is a schematic top view of an end cap provided in some other embodiments of the present application.

FIG. 9 is a schematic top view of an end cap provided in some other embodiments of the present application.

As shown in FIG. 9, in some embodiments, a projection of the third recess 331 in the thickness direction is linear. The linear third recess 331 is easy to form.

Figure 10:
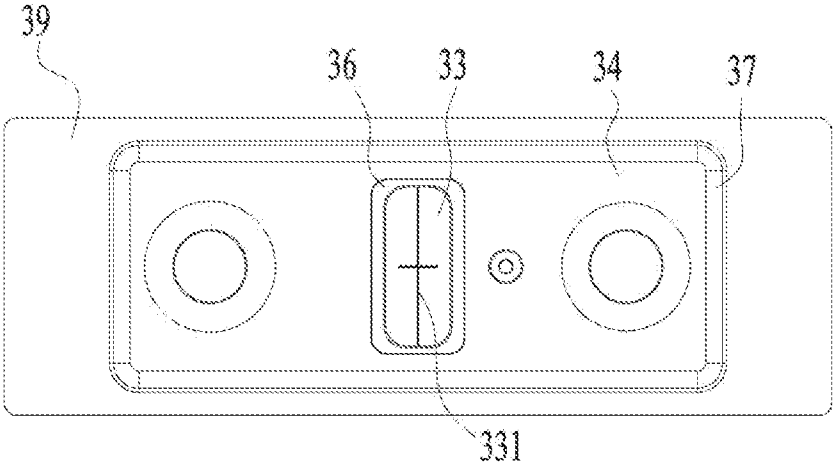
FIG. 10 is a schematic top view of an end cap provided in still some other embodiments of the present application.

FIG. 10 is a schematic top view of an end cap provided in still some other embodiments of the present application.

As shown in FIG. 10, the projection of the third recess 331 in the thickness direction is cross-shaped. When the internal pressure of the battery cell reaches the threshold, the pressure relief portion 33 is broken at a cross point and divided into four pieces which are folded outward in four directions.

Figure 11:
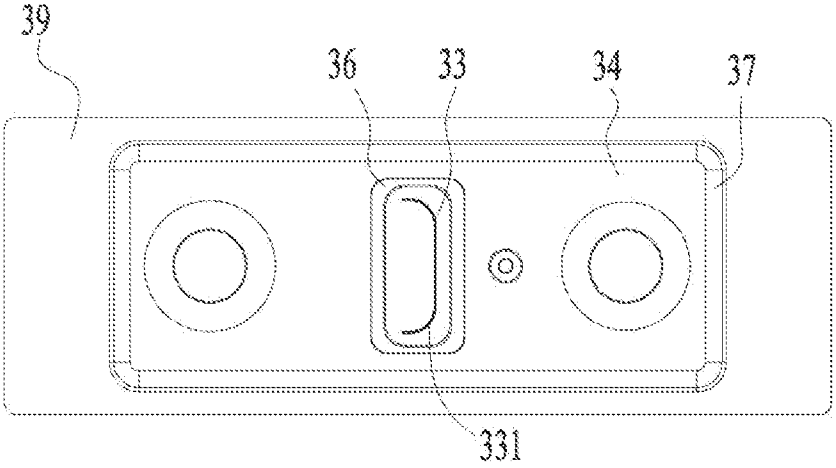
FIG. 11 is a schematic top view of an end cap provided in yet some other embodiments of the present application.

FIG. 11 is a schematic top view of an end cap provided in yet some other embodiments of the present application. As shown in FIG. 11, the projection of the third recess 331 in the thickness direction is U-shaped. When the internal pressure of the battery cell reaches the threshold, the pressure relief portion 33 is broken along the U-shaped third recess 331, and a region enclosed by the U-shaped third recess 331 is folded outward.

It should be noted that the embodiments in the present application and features in the embodiments may be combined with each other without conflicts.

Finally, it should be noted that the foregoing embodiments are merely used for illustrating rather than limiting the technical solutions of the present application. Although the present application has been illustrated in detail with reference to the foregoing embodiments, it should be understood by those of ordinary skill in the art that the technical solutions described in the foregoing embodiments may still be modified, or some of the technical features therein may be equivalently substituted, but these modifications or substitutions do not make the essence of corresponding technical solutions depart from the spirit and scope of the technical solutions of the embodiments of the present application.

What is claimed is:

1. An end cap of a battery cell, comprising:

a first recess recessed from a side of the end cap facing toward an electrode assembly of the battery cell in a direction away from the electrode assembly;

a second recess recessed from a side of the end cap facing away from the electrode assembly in a direction toward the electrode assembly, wherein a bottom wall of the second recess comprises a first part and a second part surrounding an outer side of the first part, the first part and a bottom wall of the first recess are arranged opposite to each other in a thickness direction of the end cap, a side wall of the second recess connected to the second part of the bottom wall, and the side wall of the second recess is inclined relative to a vertical direction;

a pressure relief portion formed between the first part and the bottom wall of the first recess, wherein the pressure relief portion is configured to be actuated, in response to an internal pressure of the battery cell reaching a threshold, to relieve the internal pressure, and a side of the second part facing away from the electrode assembly forms an avoidance space to avoid the pressure relief portion when the pressure relief portion is actuated;

a body portion comprising an inner surface and an outer surface arranged opposite to each other in the thickness direction, the inner surface facing toward the electrode assembly;

a connecting portion surrounding an outer side of the body portion and extending in the direction toward the electrode assembly to form a third recess on a side of the body portion facing toward the electrode assembly; and a plate portion surrounding an outer side of the connecting portion, the third recess being recessed relative to a surface of the plate portion facing toward the electrode assembly, and in the thickness direction of the end cap, the inner surface being closer to the outer surface than both a top surface and a bottom surface of the plate portion.

2. The end cap according to claim 1, wherein the pressure relief portion is configured to be broken at the third recess to relieve the internal pressure in response to the internal pressure of the battery cell reaching the threshold.

3. The end cap according to claim 2, wherein when the pressure relief portion is actuated, at least part of the pressure relief portion is folded into the second recess.

4. The end cap according to claim 1, wherein a projection of the third recess in the thickness direction is linear, cross-shaped, U-shaped, or ring-shaped.

5. The end cap according to claim 2, wherein the third recess is ring-shaped and comprises a first sub-recess and a second sub-recess that are continuously provided along a circumference of the third recess, and a depth of the first sub-recess is greater than a depth of the second sub-recess so that when the internal pressure of the battery cell reaches the threshold, the pressure relief portion is broken at the first sub-recess and folded along a bottom of the second sub-recess.

6. The end cap according to claim 1, further comprising:

a first protrusion protruding from the inner surface, wherein the first recess is recessed from a top end face of the first protrusion in the direction away from the electrode assembly; and a second protrusion protruding from the outer surface, wherein the second recess is recessed from a top end face of the second protrusion in the direction toward the electrode assembly.

7. The end cap according to claim 6, wherein a depth of the second recess in the thickness direction is greater than a size of the second protrusion in the thickness direction, so that the bottom wall of the second recess is closer to the electrode assembly than the outer surface.

8. The end cap according to claim 6, wherein a depth of the first recess in the thickness direction is less than a size of the first protrusion in the thickness direction, so that the bottom wall of the first recess is closer to the electrode assembly than the inner surface.

9. The end cap according to claim 6, wherein in the thickness direction, a size of the first protrusion is greater than a size of the second protrusion.

10. The end cap according to claim 6, wherein the first protrusion is accommodated in the third recess.

11. The end cap according to claim 1, wherein the end cap is of an integrally formed structure.

12. A battery cell, comprising:

a housing provided with an opening;

an electrode assembly accommodated in the housing; and the end cap according to claim 1 configured to cover the opening of the housing.

13. A battery, comprising:

a case; and a battery cell received in the case, the battery cell comprising:

a housing provided with an opening;

an electrode assembly accommodated in the housing; and the end cap according to claim 1 configured to cover the opening of the housing.

14. A power consuming device, comprising the battery of claim 13, wherein the battery is configured to supply electric energy.

15. An end cap of a battery cell, comprising:

a first recess recessed from a side of the end cap facing toward an electrode assembly of the battery cell in a direction away from the electrode assembly;

a second recess recessed from a side of the end cap facing away from the electrode assembly in a direction toward the electrode assembly, wherein a bottom wall of the second recess comprises a first part and a second part surrounding an outer side of the first part, and the first part and a bottom wall of the first recess are arranged opposite to each other in a thickness direction of the end cap;

a pressure relief portion formed between the first part and the bottom wall of the first recess, wherein the pressure relief portion is configured to be actuated, in response to an internal pressure of the battery cell reaching a threshold, to relieve the internal pressure, and a side of the second part facing away from the electrode assembly forms an avoidance space to avoid the pressure relief portion when the pressure relief portion is actuated;

a body portion comprising an inner surface and an outer surface arranged opposite to each other in the thickness direction, the inner surface facing toward the electrode assembly;

a first protrusion protruding from the inner surface in the direction toward the electrode assembly with a first height, the first recess being recessed from a top end face of the first protrusion toward the direction away from the electrode assembly with a depth, the depth being smaller than the height, and in the thickness direction, a distance between the inner surface and the top end face of the first protrusion is greater than a distance between the top end face of the first protrusion and the bottom wall of the first recess;

a connecting portion surrounding an outer side of the body portion and extending in the direction toward the electrode assembly to form a third recess on a side of the body portion facing toward the electrode assembly; and a plate portion surrounding an outer side of the connecting portion, the third recess being recessed relative to a surface of the plate portion facing toward the electrode assembly, and in the thickness direction of the end cap, the inner surface being closer to the outer surface than both a top surface and a bottom surface of the plate portion.

16. An end cap of a battery cell, comprising:

a first recess recessed from a side of the end cap facing toward an electrode assembly of the battery cell in a direction away from the electrode assembly;

a second recess recessed from a side of the end cap facing away from the electrode assembly in a direction toward the electrode assembly, wherein a bottom wall of the second recess comprises a first part and a second part surrounding an outer side of the first part, and the first part and a bottom wall of the first recess are arranged opposite to each other in a thickness direction of the end cap;

a pressure relief portion formed between the first part and the bottom wall of the first recess, wherein the pressure relief portion is configured to be actuated, in response to an internal pressure of the battery cell reaching a threshold, to relieve the internal pressure, and a side of the second part facing away from the electrode assembly forms an avoidance space to avoid the pressure relief portion when the pressure relief portion is actuated;

a body portion comprising an inner surface and an outer surface arranged opposite to each other in the thickness direction, the inner surface facing toward the electrode assembly;

a connecting portion surrounding an outer side of the body portion and extending in the direction toward the electrode assembly to form a third recess on a side of the body portion facing toward the electrode assembly; and a plate portion surrounding an outer side of the connecting portion, the third recess being recessed relative to a surface of the plate portion facing toward the electrode assembly, and in the thickness direction of the end cap, the inner surface being closer to the outer surface than both a top surface and a bottom surface of the plate portion.

* * * * *